United States Patent [19]
Hollrock

[11] 3,838,940
[45] Oct. 1, 1974

[54] DEPLOYABLE ROTOR

[75] Inventor: Richard H. Hollrock, Simsbury, Conn.

[73] Assignee: Kaman Aerospace Corporation, Bloomfield, Conn.

[22] Filed: Sept. 20, 1972

[21] Appl. No.: 290,635

[52] U.S. Cl. .............................. 416/142, 244/138
[51] Int. Cl. .... B64c 11/28, B64c 27/44, B64c 27/50
[58] Field of Search ........... 416/142, 143, 205, 153, 416/2; 244/138 A

[56] References Cited
UNITED STATES PATENTS

| | | | |
|---|---|---|---|
| 2,440,293 | 4/1948 | Stanley | 244/138 |
| 2,526,451 | 11/1950 | Benson | 244/138 |
| 3,142,219 | 7/1964 | Martin | 244/141 |
| 3,175,619 | 3/1965 | Reed, Jr. | 416/142 |
| 3,194,519 | 7/1965 | Rhodes | 244/138 |

Primary Examiner—Everette A. Powell, Jr.
Assistant Examiner—Louis J. Casaregola
Attorney, Agent, or Firm—McCormick, Paulding & Huber

[57] ABSTRACT

A deployable stowed rotor having a rotor hub to which a pair of telescoping rotor blades are connected is foldable into a small package suitable for stowage prior to use. When the rotor is deployed, for example, as a lifting device for an ejection seat or space capsule, the hinge arrangement between the blades and the rotor hub induces rotor spin-up while the blades are aligned generally parallel to the rotor axis. The hinge arrangement also aids in controlling the rotor speed until the rotor and connected load are decelerated to a terminal descent rate. A restraining mechanism associated with the hinge arrangement is then released and permits the rotor to assume a different configuration more suited to autorotation during the terminal descent phase of flight.

9 Claims, 8 Drawing Figures

PATENTED OCT 1 1974 3,838,940

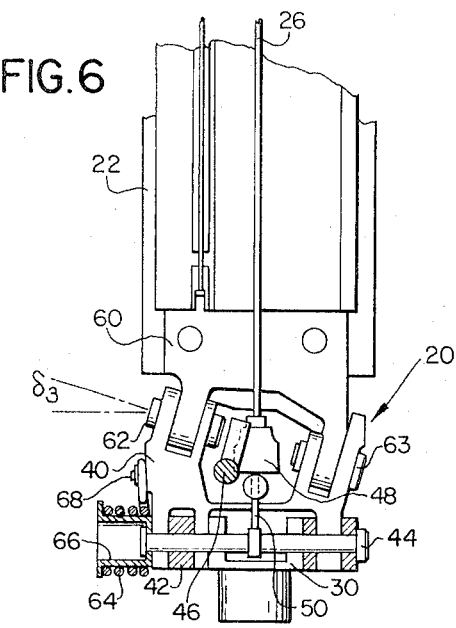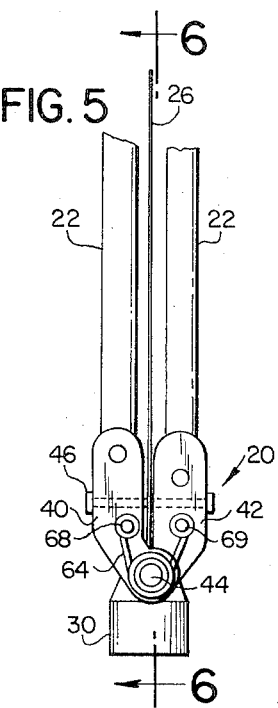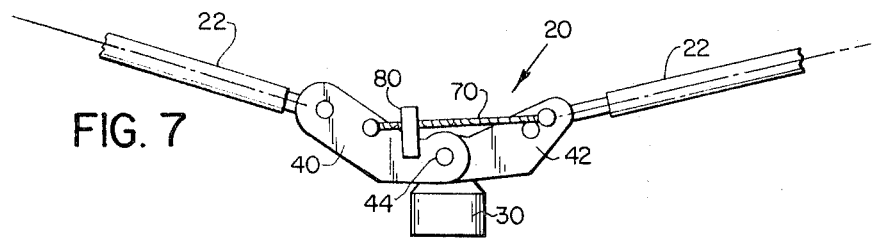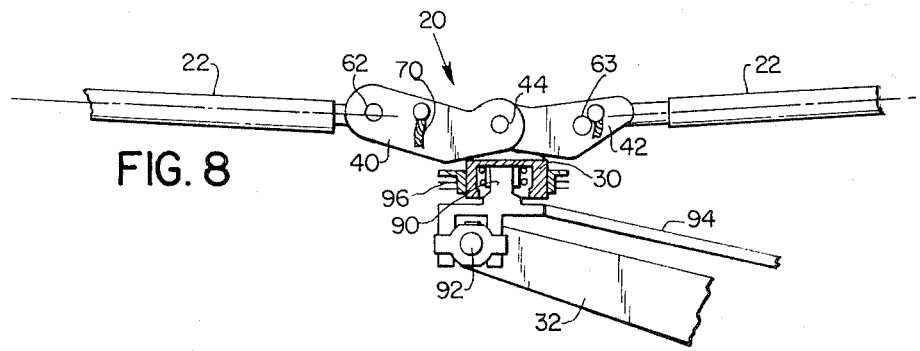

/ 1
DEPLOYABLE ROTOR

BACKGROUND OF THE INVENTION

The present invention relates to the field of aerodynamic lifting rotors, and more particularly, is concerned with a rotor that is deployed from a stowed condition to a flight condition when the need arises.

The use of lift-generating rotors to retard the descent rate of aerodynamic or non-aerodynamic bodies such as space vehicles or ejection seats has been known for some time. A rotor system of this type is frequently capable of being folded into a configuration permitting storage prior to use. When the rotor is called upon to function, it is pulled from its stowed position and deployed with the aid of other devices, such as drogue chutes, explosive actuators or energy storage reservoirs.

In the simpler recovery systems, the rotor is not driven by an auxiliary power supply but instead relies upon the relative flow of air through the rotor system to produce rotation and lift, sometimes referred to as drag in this environment, to retard the descent rate of the vehicle.

Two problems encountered in the deployment of a non-powered rotor are the initial spin-up of the rotor during the early stages of flight and controlling the rotor speed as the suspended body is decelerated to its terminal descent rate. These problems are recognized in U.S. Pat. No. 2,440,293 which discloses in one embodiment a rotor structure which utilizes a resilient member to force the blades from their stowed to flight positions. The patented rotor also employs flap-to-pitch coupling which during the deployment phase of flight aids in spinning the rotor up to its operating speed and in controlling that speed once it has been attained. In analytical studies of a rotor system, the flap-to-pitch coupling is commonly referred to as a $\delta_3$ factor or effect; hence, reference to the $\delta_3$ effect is well known to persons skilled in the aerodynamic rotor art.

Even though the $\delta_3$ effect is desirable during the rotor spin-up phase of deployment, after the rotor has reached its operating speed and the autorotation stage of flight begins, the rotor configuration with the $\delta_3$ effect does not permit optimization of rotor performance with maximum lift-to-drag ratio.

It is accordingly a general object to the present invention to provide a rotor which will spin up to operating speed after deployment and then continue to operate at its optimum performance level for autorotation in a terminal descent phase of flight.

SUMMARY OF THE INVENTION

The present invention resides in a deployable rotor having a plurality of rotor blades mounted on a rotor hub for folding and unfolding between stowed and flight positions. The rotor might be used, for example, as the lifting device to retard the descent rate of an aircraft ejection seat or space capsule.

The rotor blades are attached to the rotor hub by means of a plurality of connecting links, one link for each of the blades. Each link forms an inner hinge at one end with the rotor hub and an outer hinge at the other end with a rotor blade. The outer hinge lies generally radially outward of the inner hinge when the blades are fully deployed in the flight position and provides $\delta_3$ coupling for rotor spin and speed control during the deceleration and spin-up phase of flight.

Restraining means such as a cable is connected with each of the links to limit the coning angle of the links to an angle no less than a preselected value. As long as the coning of the links is limited by the restraining means, the $\delta_3$ factor of the outer hinge is effective to control the rotor speed.

Release means are operatively connected to the restraining means to render the restraining means inoperative upon the links. The release means may be, for example, an explosively detonated cutter which severs the restraining cable interconnecting the links. The centrifugal forces operating upon the blades straighten the outer hinge of the unrestrained links and effectively lock out the $\delta_3$ effect during the autorotation phase of flight. By eliminating the $\delta_3$ effect, the rotor may in turn operate closer to an optimum lift-to-drag ratio as the suspended body descends to a landing point.

BRIEF DESCRIPTION OF THE DRAWINGS

FIG. 5 is a front elevation view of the deployable rotor with the rotor blades folded in the parallel relationship maintained during stowage and the early phases of deployment.

FIG. 6 is a sectional view of the deployable rotor as viewed along the sectioning line 6—6 in FIG. 5.

FIG. 7 is an elevation view of the deployable rotor during the spin-up and deceleration phase of flight.

FIG. 8 is an elevation view of the deployable rotor during the autogyro phase of a flight.

DESCRIPTION OF PREFERRED EMBODIMENTS

Figure 2:
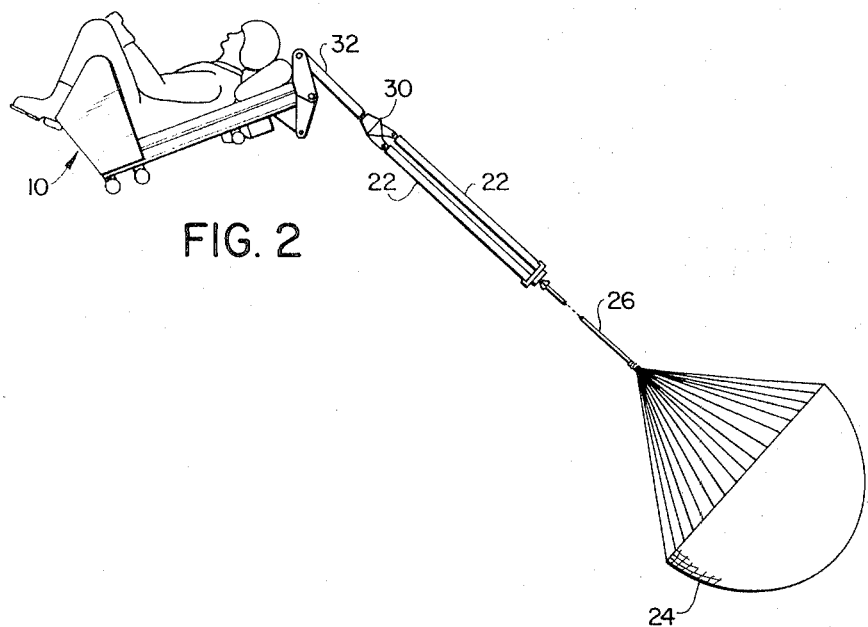
FIG. 2 shows the ejection seat vehicle of FIG. 1 during the initial rotor deployment phase of flight.

Although the deployable rotor of the present invention can be utilized with many bodies requiring controlled descent rates, the rotor is shown in the drawing as it would be employed in an aircraft ejection seat vehicle. The general construction and operation of the rotor described in connection with FIGS. 5-8 will be substantially the same when the rotor is employed for other purposes such as retarding the descent rate of a space capsule as it reenters the atmosphere.

Figure 1:
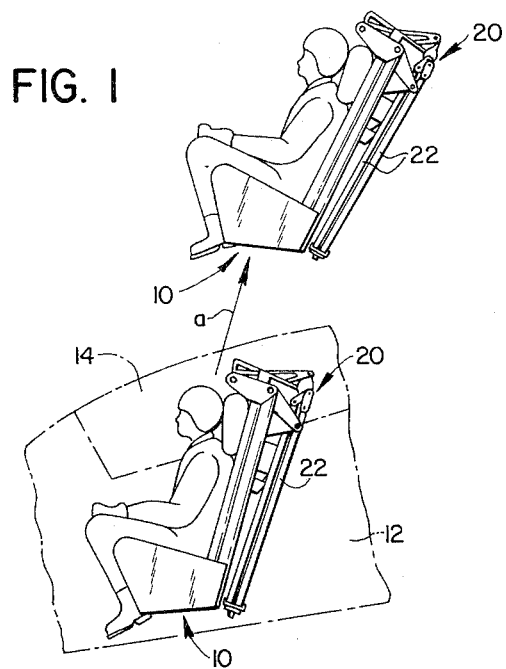
FIG. 1 shows an ejection seat vehicle incorporating the deployable rotor of the present invention at two stages of an ejection phase of flight.

FIGS. 1-4 show the deployable rotor of the present invention in different configurations assumed sequencely as an ejection seat, generally designated 10, is expelled from an aircraft 12 shown in fragmentary fashion in FIG. 1. The general sequence of events during and after ejection from the aircraft are as follows.

In FIG. 1, the canopy 14 over the cockpit of the aircraft is blown or pushed off and the ejection seat 10 is expelled from the cockpit upwardly as indicated by the arrow $a$. The deployable rotor, generally designated 20, is held in its stowed position with two rotor blades 22 folded at the rear of the seat 10.

When the seat has been completely ejected and cleared the aircraft, a drogue chute 24 is released to begin deployment of the rotor as shown in FIG. 2. The chute 24 is connected to the rotor by means of a drag line 26 that leads from the tips of the folded blades inwardly toward the rotor hub 30. The rotor hub is pivotally connected to the ejection seat 10 by means of a mast 32 so that the rotor may pivot between the stowed and flight positions shown in the sequence of FIGS. 1–4.

Figure 3:
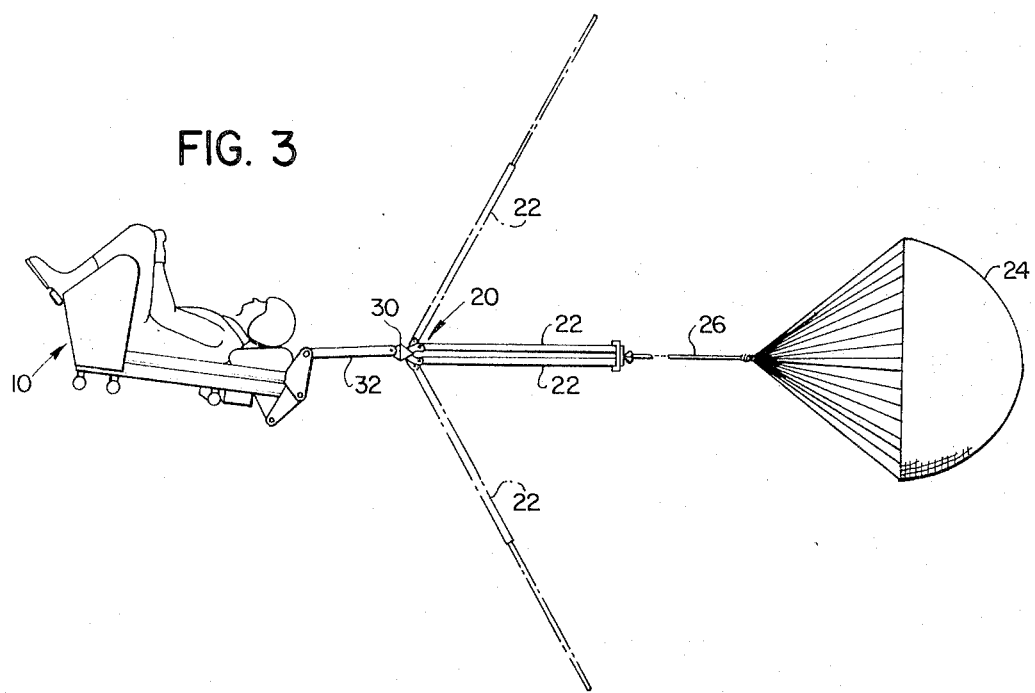
FIG. 3 shows the ejection seat vehicle of FIG. 1 during the deceleration and spin-up phase of flight.

In FIG. 3 the ejection seat 10 and the rotor 20 are shown during the deceleration and spin-up phase of flight. During this phase the drogue chute 24 is separated from the rotor by detonating an explosive link which severs the drag line 26. Also, the binding mechanism, for example, a wrap cable or explosive tie bolt holding the rotor blades 22 packaged in parallel relationship, is released to permit the blades to open as shown in phantom. After the blades have been freed of the binding mechanism, the rotor causes the blades to become skewed as described in greater detail below and blade rotation is induced by the relative flow of air over the skewed blades.

The rotor blades 22 shown in the phantom position in FIG. 3 are telescoping blades. Blades of this type are disclosed in greater detail in the copending patent application Ser. No. 172,772 filed Aug. 18, 1971 in the name of the present inventor. As the blades pick up speed and assume the extended positions, the rotor begins producing lift or drag to decelerate the ejection seat 10 toward a terminal descent rate. During this deceleration phase, the rotor is governed to prevent the rotor blades from acquiring an excessive rotational speed. The speed control features are also described in greater detail below.

Figure 4:
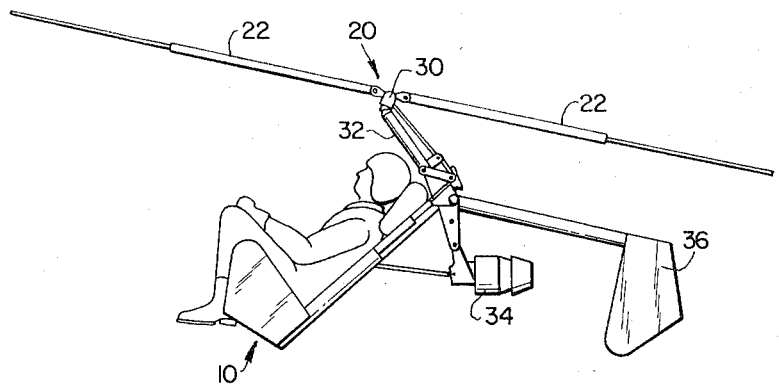
FIG. 4 shows the ejection seat vehicle during the autogyro phase of flight with the rotor fully deployed.

When the terminal descent rate of the ejection seat is reached, the rotor 20 is fully deployed as shown in FIG. 4 and the terminal flight phase begins. In this phase the pilot assumes limited control over the location of the center of gravity of the ejection vehicle relative to the thrust vector of the rotor 20 to permit maneuvering. The rotor 20 operates as an autogyro. In accordance with the present invention, the speed control feature operating during the deceleration phase of flight is eliminated and the configuration of the rotor is modified to optimize the lift-to-drag ratio of the rotor for autorotation. In one type of ejection vehicle, a thrust motor 34 and a pair of vertical tail surfaces 36 are extended to provide controlled forward flight.

For more detailed explanation and showing of the ejection seat vehicle and rotor support mechanism, reference may be had to the inventor's U.S. Pat. No. 3,662,978 issued May 16, 1972.

Turning more specifically to the construction of the rotor 20, reference is made to FIGS. 5 and 6 in which the two rotor blades 22 are shown in the folded position maintained while the rotor is stowed and during the initial stages of deployment. The inner ends or roots of the rotor blades are connected to diametrically opposite sides of the rotor hub 30 by means of connecting links 40 and 42 respectively. Each connecting link has a dog-leg configuration which permits a single hinge pin 44 to attach both links to the hub 30 and at the same time allows the blades 22 to be folded parallel to one another and thereby form a tightly arranged package. Because of the manner in which the links 40 and 42 share the hinge pin 44, they effectively form interlocking hinges. When the rotor is operating at speed, the centrifugal loading of the blades is reacted directly through the hinges and not through the hub 30. Only the flapping or teetering motions of the links and rotor blades produce movement relative to the hub 30 and consequently the pin 44 defines the teetering axis of the rotor.

Extending between each of the links in FIG. 5 is an explosive tie bolt 46 which holds the blades at the inner ends and the links in the folded position. A wrap cable or other device would be used to hold the outer or projecting ends of the blades together prior to the rotor spin-up and deceleration phase of flight. A molded spacer may also be positioned between the folded blades to protect them during stowage.

The drag line 26 which connects the drogue chute 24 to the rotor extends parallel to and between the folded blades and connects to the hinge pin 44 by means of a swivel connector 48 and an explosive link 50. As the spin-up and deceleration phase of flight is begun, the tie bolt 46 is detonated and the other wrap mechanism holding the blades is severed to allow the blades to assume an open or coned position such as shown in phantom in FIG. 3. After the blades have spread and begun to rotate, the link 50 is exploded, and the drag line 26 and the swivel connector 48 are jettisoned along with the drogue chute 24.

In accordance with the present invention the outer end of the link 40 and the blade grip 60, fixedly secured to the inner end of one blade 22, are coupled together by hinge pins 62 and 63. Since the axis of the pins 62 and 63 is at an angle to the longitudinal axis of the blade 22, the hinge formed by the link 40 and the grip 60 produces flap-to-pitch coupling or a $\delta_3$ effect. The link 42 is attached to the other blade 22 with the same $\delta_3$ hinge construction, and hence is not shown in detail. The $\delta_3$ hinges not only aid in rotor control as the ejection seat is decelerated, but also induce initial rotor spin-up.

Complementing the $\delta_3$ hinges is a coil spring 64. The spring 64 is mounted coaxially of the hinge pin 44 on a cup-shaped mount 66. The ends of the spring 64 are captured on lugs 68 and 69 fixed to the links 40 and 42 respectively. The torsional loading of the spring 64, therefore, spreads the links 40 and 42 after the explosive tie bolt 46 is broken. As the links 40 and 42 are spread to an open or coned position, the rotor blades 22 assume a skewed relationship due to the $\delta_3$ hinge. With the blades in the trailing position shown in FIG. 3 and in skewed relationship, an asymmetric aerodynamic force on the blades causes them to initiate rotation of the hub 30. As the rotational speed of the rotor increases, centrifugal forces also spread the blades and permit the telescoping blade sections to extend.

The blades 22 and the links 40 and 42 spread and thereby, assume smaller coning angles. Therefore, for the purpose of this specification, a coning angle is defined as the angle between a blade or link and a plane perpendicular to the axis about which the blades or links rotate. As shown in FIG. 7, the coning angle of the links 40 and 42 is limited by a cable 70 interconnecting the two links. The cable 70 is a mechanical limit stop and effectively restrains the spreading motion of the links so that the coning angle is limited to an angle no less than a preselected value. The rotor during the deceleration phase of flight is designed to operate at a sustained rotational speed which causes the rotor blades 22 to assume a coning angle smaller than that of the links restrained by the cable 70. Centrifugal forces of the blades, operating through the links 40 and 42, hold the cable 70 in tension so that the links and cable are effectively a single, rigid unit and flapping motions of the blades take place entirely at the $\delta_3$ hinges between the links and the blades. The flap-to-pitch coupling provided by the hinges aides in controlling rotor speed at the designed level which generates lift or drag to decelerate the ejection seat 10. The coupling decreases the pitch of the blades if the rotor speed falls below the designed speed and increases the pitch of the blades if the rotor speed exceeds the designed speed. In this manner, the principal danger of overspeeding the rotor during a critical phase of flight is avoided.

After the ejection seat 10 has been decelerated by a desired amount as determined, for example, by sensors on the ejection seat itself or by a speed sensor on the rotor, the cable 70 is severed by an explosively actuated cutter 80 to release the links 40 and 42 at the limited coning angle. Since the hinge pin 44 is incapable of transmitting moments between the links 40 and 42 or from the rotor hub 30 to the links, centrifugal forces cause the link 40 and its blade 22 to straighten out and become aligned with one another. In the same respect, the link 42 becomes aligned with its blade 22. The same coning angle is, therefore, assumed by both the links and the blades. Centrifugal forces continue to hold the links and their respective blades in alignment and effectively lock out the $\delta_3$ hinges. Flap-to-pitch coupling and rotor speed regulation are terminated. With such configuration, the rotor 20 operates at a more efficient lift-to-drag ratio suitable for autorotation during the autogyro-phase of flight.

The rotor hub 30 in FIG. 8 is supported for rotation on the rotor shaft 90 and the shaft in turn is connected to the mast 32 by means of a universal joint 92. For maneuvering, two pilot control rods 94 (one not visible) connect to the plate supporting the rotor shaft 90 and make possible direct tilting of the rotor shaft, and consequently the thrust vector, relative to the center of gravity of the ejection vehicle.

Slip rings 96 may be mounted on the outer periphery of the hub 30 and carry electrical conductors between the rotor and the mast in order to communicate electrical signals from the ejection seat 10 to the detonators of the explosive members 46, 50 and 80 at appropriate times during the deployment of the rotor.

While the present invention has been described in a preferred embodiment, it will be readily understood that numerous modifications and substitutions can be had to the specific structure shown without interferring with the described operation. For example, the coil spring 64 which spreads the connecting links 40 and 42 may have numerous other configurations and can be located at stations off of the pivot axis of pin 44. It is also possible to replace the spring entirely with an explosively detonated actuator or the drogue chute can be utilized to operate spreading bars connected to the links. Although the restraining cable 70 interconnects only two rotor blades, it will be understood that a similar restraining mechanism can be employed with rotors having three or more blades simply by increasing the number of cables and cutters used or by lacing a single cable through each of the links. The restraint provided by the cables can also be derived from mechanical stops associated with the links. Such mechanical stops, of course, would be connected to a suitable release mechanism to permit the $\delta_3$ hinges to be locked out during the autogyro-phase of flight. Accordingly, the present invention has been described in a preferred embodiment by way of illustration rather than limitation.

I claim:

1. A deployable rotor having a plurality of rotor blades mounted on a rotor hub for movement between stowed and flight positions comprising: a plurality of connecting links, one for each of the plurality of blades, connected between the rotor hub and the respective rotor blades, each link forming an inner hinge at one end with the rotor hub and an outer hinge at the other end with a rotor blade, the outer hinge between the link and the blade providing flap-to-pitch coupling; restraining means including a cable interconnecting each of the connecting links to limit the coning angle of the links to an angle no less than a preselected value; and release means including a cable cutter operatively connected with the cable of the restraining means to sever the cable whereby the connecting links are permitted to assume the same coning angle as the blades and the coupling effect of the outer hinges is locked out.

2. A deployable rotor having a plurality of rotor blades mounted on a rotor hub for movement between stowed and flight positions comprising: a plurality of connecting links, one for each of the plurality of blades, connected between the rotor hub and the respective rotor blades, each link forming an inner hinge at one end with the rotor hub and an outer hinge at the other end with a rotor blade, the outer hinge between the link and the blade providing flap-to-pitch coupling; restraining means connected with each of the connecting links for limiting the coning angle of the links to an angle no less than a preselected value; a slip ring assembly circumscribing the rotor hub and including rotating electrical contact members mounted on the hub; and release means including an electrically operated explosive member electrically connected to the rotating contact members of the slip ring assembly on the hub and operatively connected with the restraining means to render the restraining means inoperative upon the links whereby the connecting links are permitted to assume the same coning angle as the blades and the coupling effect of the outer hinges is locked out.

3. A deployable rotor as defined in claim 2 wherein the restraining means comprises a cable interconnecting each of the connecting links to limit the coning angle of the links.

4. A deployable rotor as defined in claim 1 further including spreading means connected to the links for urging the links toward a spread position.

5. A deployable rotor as described in claim 4 wherein the spreading means comprises a spring member extending between two of the plurality of links.

6. A deployable rotor as in claim 1 wherein there are two connecting links associated respectively with two blades at diametrically opposite sides of the rotor hub and the inner hinges of the two links are interlocking hinges and thereby define the teetering axis of the rotor.

7. A deployable rotor in claim 6 wherein each of the two connecting links has a dog-leg configuration.

8. A deployable rotor as defined in claim 6 wherein spreading means are provided between the two links and include a coil spring mounted concentrically of the teetering axis of the interlocking hinges.

9. A deployable rotor as defined in claim 6 wherein the two connecting links are pivotable relative to the rotor hub and to each other into positions in which the rotor blades lie parallel to one another for stowing.

* * * * *